United States Patent [19]
Venditto, Jr. et al.

[11] Patent Number: 5,150,286
[45] Date of Patent: Sep. 22, 1992

[54] APPARATUS AND METHOD FOR PROTECTING ELECTRONIC CIRCUITRY FROM DAMAGE

[75] Inventors: Joseph G. Venditto, Jr., Perkasie; James P. Detweiler, Lansdale, both of Pa.

[73] Assignee: Performance Controls, Inc., Horsham, Pa.

[21] Appl. No.: 668,122

[22] Filed: Mar. 12, 1991

[51] Int. Cl.$^5$ .......................................... H02M 3/335
[52] U.S. Cl. ...................................... 363/56; 363/21; 363/49; 363/97; 323/267; 361/57
[58] Field of Search ....................... 363/20, 21, 95, 97, 363/49, 56, 65; 323/901, 902, 267; 361/18, 57, 100

[56] References Cited

U.S. PATENT DOCUMENTS

| | | | |
|---|---|---|---|
| 4,631,470 | 12/1986 | Bingley | 363/56 |
| 4,695,937 | 9/1987 | Verity | 363/97 |
| 4,799,138 | 1/1989 | Chahabadi et al. | 363/97 |
| 4,914,560 | 4/1990 | Oh et al. | 363/56 |

Primary Examiner—Peter S. Wong
Attorney, Agent, or Firm—William H. Eilberg

[57] ABSTRACT

The invention icludes a device for protecting electronic circuitry from damage, especially damage resulting from high neutron flux density produced by a nuclear explosion. The invention protects the circuitry by disabling its power supply system upon detection of the nuclear event. The power supply system is disabled both by short-circuiting the main power supply, which provides control voltages to various subsidiary powert supplies, and by short-circuiting all the output filter capacitors in the system, which may have a substantial residual charge. The invention periodically and automatically attempts to re-start the power supply system, but the system can be re-started only if the nuclear event detector is not actuated. The circuit made according to the invention is entirely analog, and therefore does not depend, for its operation, on the continued functioning of the circuitry to be protected. The circuit of the invention responds very quickly, and provides a rapid, orderly shutdown of the power supply system. Therefore, the circuit of the present invention, and the circuitry being protected, are both likely to survive the nuclear event.

20 Claims, 3 Drawing Sheets

APPARATUS AND METHOD FOR PROTECTING ELECTRONIC CIRCUITRY FROM DAMAGE

BACKGROUND OF THE INVENTION

This invention relates to the field of protection of electronic circuitry. In particular, the invention comprises a device which protects electronic circuitry from damage due to a nuclear explosion.

A nuclear explosion causes a brief, sudden, intense flux of neutrons. A large flux density of neutrons can be disastrous for semiconductor devices such as microchips. The flux of neutrons tends to turn semiconductor switches "on". Thus, a nuclear explosion, or "nuclear event", presents two distinct problems. First, by randomly actuating semiconductor switches in a circuit, the neutron flux effectively causes total loss of control over the circuit. Secondly, when most or all of the semiconductor switches have been actuated at once, abnormally large currents are likely to flow, and these currents can destroy the entire circuit.

A typical power supply system includes a main power supply which provides control voltages to a plurality of other power supplies, each of which is used to supply power to a particular sub-circuit. The power supplies in the system may be controlled by a pulse-width modulated (PWM) signal, and the control voltages provide power to the PWM circuits in each power supply in the system.

During a nuclear event, it is necessary to disable not only the main power supply but also all of the subsidiary supplies in the system. It is especially important to discharge the output filter capacitors for each supply, because the charge on these capacitors is large and potentially damaging, especially when combined with the effects of a nuclear event.

Protection devices for electronic circuits have been known in the prior art. Typical circuits use silicon controlled rectifiers and zener diodes to clamp the output of a power supply to a predetermined level, upon detection of an excessive voltage condition. However, the response time of such circuits is too long to provide adequate protection from the very sudden neutron flux that would be experienced during a nuclear event. Furthermore, such protective circuits may be dependent on the operation of circuitry which itself becomes disabled during a nuclear event.

The present invention provides a circuit which automatically and rapidly disables a power supply system upon detection of a nuclear event, and which automatically and periodically attempts to re-start the system, on the assumption that the burst of neutrons may have been abated. The invention can be used to control power supply systems used in many different applications. For example, thermal imaging systems, microprocessors, motor drives, and other devices, can all be protected from damage by using the present invention.

SUMMARY OF THE INVENTION

The power supply system to be disabled, according to the present invention, includes a main power supply and a plurality of subsidiary power supplies. A nuclear event detector generates a signal that actuates electronic switches connected across each power supply, so as to create a temporary short-circuit across the output of each power supply in the system. The electronic switches also short-circuit the output filter capacitor of each power supply in the system. Moreover, the signal is also connected to disable the main power supply that powers the control circuitry of the subsidiary supplies.

The detector accomplishes the above effect by generating a pulse which is transmitted through a transformer, to a plurality of secondary windings. The pulse appearing across each of the secondary windings creates a temporary short-circuit across each output of the power supplies in the system, by causing a field-effect transistor (FET), connected across each output filter capacitor of each power supply, to become saturated.

Meanwhile, the signal from the nuclear event detector is connected, through a feedback loop, to the main power supply of the system. The signal transmitted through this feedback loop deactivates the main power supply of the system. Deactivation of the main power supply, together with short-circuiting of the subsidiary power supplies and their output filter capacitors, effectively disables the entire system and protects all circuits, connected to the system, from damage.

For additional protection, a relay operated by a signal responsive to the condition of the nuclear event detector disconnects the main power supply from the subsidiary power supplies, and also short-circuits the control voltage inputs of the subsidiary power supplies. The condition of the relay reverts to "normal" only when the nuclear event detector is not actuated.

Periodically, the main power supply attempts to re-start itself. The interval at which a re-start is attempted depends on the values of RC circuits in the main supply. If the detector still senses the presence of a nuclear event, the main power supply will again be cut off, before that power supply has a chance to supply power to the control circuits of the subsidiary power supplies for any significant period of time. The main supply continues to attempt to re-start itself periodically, but the re-start will be successful only when no signal from the nuclear event detector is present.

It is therefore an object of the invention to provide an apparatus and method for protecting electronic circuitry.

It is another object to provide an apparatus and method for protecting electronic circuitry from damage due to a nuclear event.

It is another object to provide an apparatus as described above, wherein the apparatus is not dependent, for its continued viability, on the operation of the devices which are intended to be protected.

It is another object to provide an analog circuit for protecting electronic circuitry by disabling the power supply of the circuitry to be protected.

It is another object to provide an apparatus and method for protecting military equipment from being disabled by the flux of neutrons caused by a nuclear explosion.

It is another object to provide a circuit which can disable a power supply system very rapidly, and in an orderly manner.

Other objects and advantages of the invention will be apparent to those skilled in the art, from a reading of the following brief description of the drawings, the detailed description of the invention, and the appended claims.

DETAILED DESCRIPTION OF THE INVENTION

The present invention protects electronic circuitry from damage due to high-density neutron flux, by disabling the power supply system which powers the circuitry.

Figure 1:
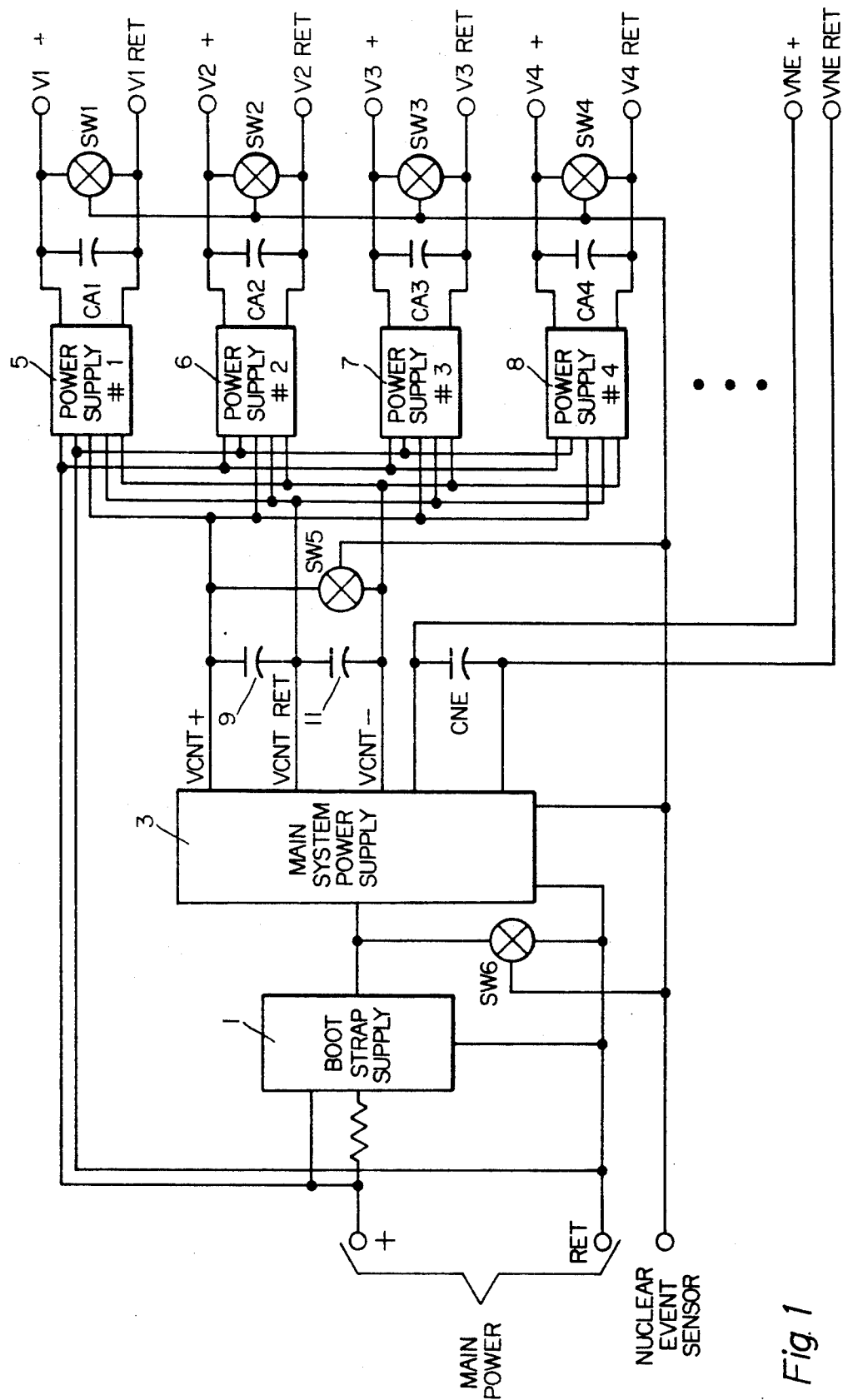
FIG. 1 is a schematic and block diagram of a power supply system which is protected by the circuit of the present invention.

FIG. 1 illustrates schematically a typical environment in which the present invention operates. The main power source powers a bootstrap power supply 1, which is used to start the main system power supply 3. The main power supply produces positive and negative control voltages, designated as $V_{CNT}^+$ and $V_{CNT}^-$. The latter voltages are measured relative to a common return or ground, designated as $V_{CNTret}$. These voltages are filtered by output filter capacitors 9 and 11. The control voltages, and the return line, are connected to a plurality of subsidiary power supplies, designated by reference numerals 5, 6, 7, and 8. The ellipsis following power supply 8 indicates that there can be additional subsidiary power supplies.

The control voltages can be used for various purposes. For example, each subsidiary power supply may include a control circuit that detects and responds to various fault conditions. One such fault condition is the condition of excessive current. Each subsidiary power supply may include circuitry for disabling that particular power supply when the over current condition is detected. The latter circuitry is entirely conventional, and forms no part of the present invention. It is therefore not shown in the drawings. Note that the circuitry, present in each subsidiary power supply, which detects and responds to excessive current conditions, comprises "local" protection, i.e. it protects only one of the power supplies in the system. The circuit of the present invention, by contrast, comprises "global" protection, i.e. it protects all of the power supplies in the system. The circuit of the present invention also responds much more quickly than the protective circuits of the prior art.

The subsidiary power supplies may also include pulse-width modulation (PWM) circuitry to control their duty cycles. Such control circuitry can be powered by the control voltages.

The subsidiary power supplies receive their main source of power directly from the main power source, as shown.

Each of the subsidiary power supplies is connected to an output filter capacitor. The filter capacitors are designated $CA_1$, $CA_2$, $CA_3$, and $CA_4$. The output voltage of subsidiary power supply 5 is called $V_1^+$, and its associated return or ground, $V_{1\ ret}$. Similar designations apply for the output voltages of the other subsidiary power supplies.

The main power supply 3 also generates a voltage designated as $V_{NE}$, which is called the "nuclear event" voltage. This voltage is filtered by output filter capacitor $C_{NE}$. The use of this voltage will be described later.

The arrangement of power supplies described above is only exemplary and not limiting. The invention can be used with power supplies having many other configurations. For example, the invention would work with a single power supply, without any subsidiary supplies, or with any other combination of main and subsidiary supplies.

The power supply system shown in FIG. 1 is disabled upon detection of a signal from a "nuclear event sensor". The nuclear event sensor itself is not shown, as its structure does not form part of the invention but FIG. 1 shows a line at which the signal appears. The sensor can be, for example, a transistor which is biased to conduct only under the extreme condition of high-density neutron flux, as would be present during a nuclear event. For purposes of this description, the nuclear event sensor can be visualized as a switch which closes when a nuclear event is detected; this analogy will be used in the description of FIG. 2, below.

The signal from the nuclear event sensor controls a plurality of switches, designated as $SW_1$ through $SW_6$. $SW_6$ is connected across the output of bootstrap power supply 1. $SW_5$ is connected across the output of main power supply 3. Switches $SW_1$ through $SW_4$ are connected across the outputs of subsidiary power supplies 5-8, respectively. In each case, the switch causes a short-circuit across the output of the power supply. The switch also discharges the respective output filter capacitors. It is understood that the number of such switches depends on the number of power supplies present in the system.

Figure 2:
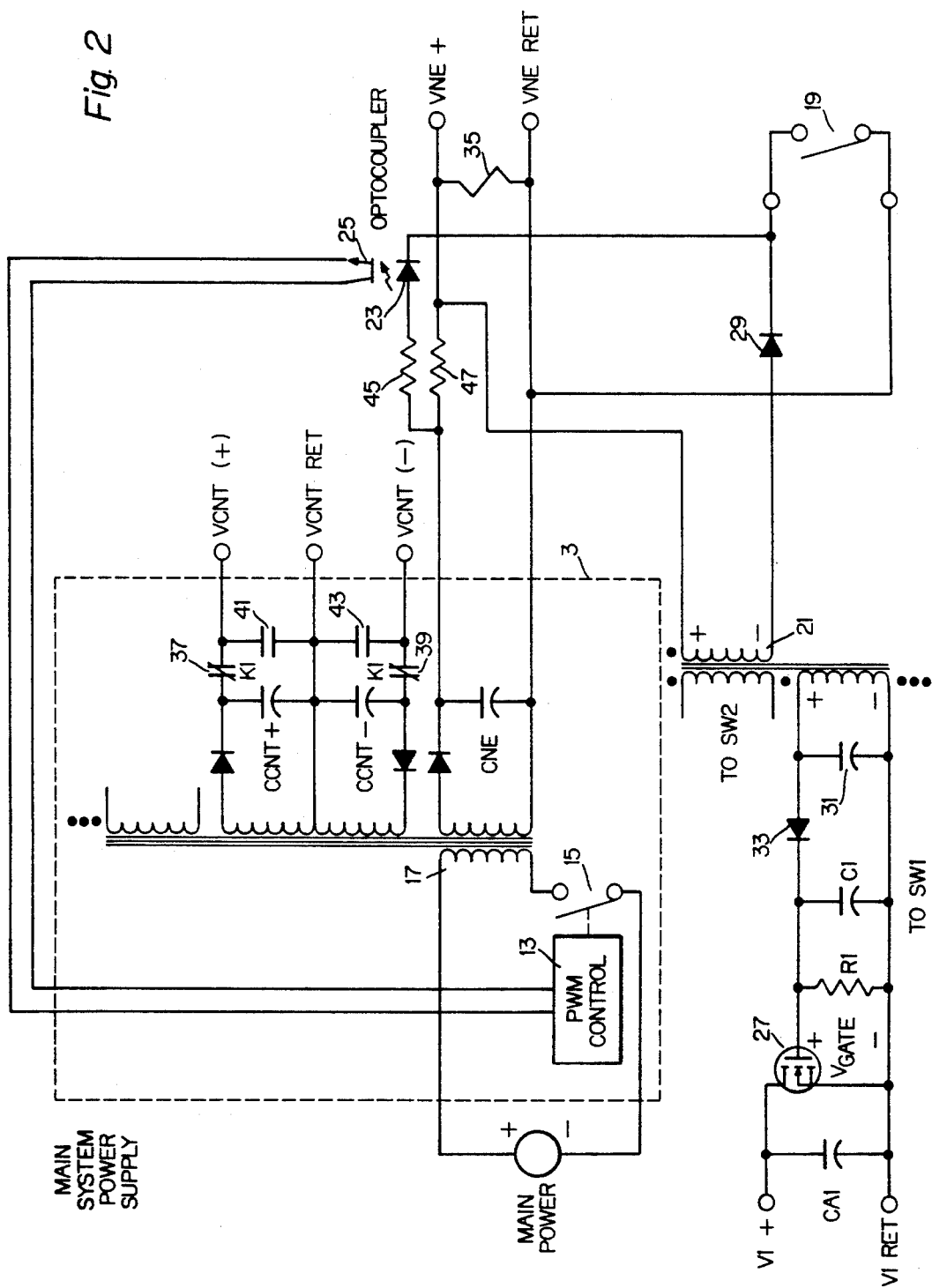
FIG. 2 is a schematic and block diagram, showing the specific circuitry of the present invention.

FIG. 2 is a schematic and block diagram showing more specifically the circuitry which comprises the present invention. Note that, in FIG. 2, the main power supply 3 is shown within the dotted line. Note also that, in FIG. 2, the bootstrap power supply has been omitted for the sake of simplicity. Also, the main power supply is assumed to include a PWM control circuit 13, which is symbolically represented as a circuit which opens and closes switch 15. Other internal arrangements of the main power supply are possible, within the scope of this invention. The invention is not limited to power supplies having a PWM control.

Also for the sake of simplicity, FIG. 2 does not show all of the various possible outputs of the main power supply, except for $V_{NE}$ and $V_{CNT}$. As indicated by the ellipsis near transformer 17, additional secondary windings can be present. Furthermore, for the sake of simplicity, FIG. 2 does not explicitly show the various subsidiary power supplies 5-8, but instead shows only the terminals where $V_1^+$ and its return voltage are available.

The main power supply generates $V_{NE}$, the nuclear event voltage. As shown, this voltage is taken from a secondary winding of transformer 17, and is rectified and filtered in the usual manner. The voltage $V_{NE}$ is used primarily to generate a control pulse, as described below, which helps to disable the power supplies in the system. However, $V_{NE}$ can also be used to power other circuitry.

The nuclear event sensor is schematically represented by switch 19. When switch 19 closes, voltage $V_{NE}$ is applied across the primary winding of isolation transformer 21. Transformer 21 has a plurality of secondary windings, each of which corresponds to a different power supply which is to be short-circuited. For simplicity of illustration, only the secondary winding corresponding to subsidiary power supply 5 (i.e. power supply No. 1) is fully shown. The other secondary windings are connected to similar components. FIG. 2 shows an ellipsis, near transformer 21, to indicate that there are, in general, additional secondary windings.

Relay coil 35 is connected across the terminals providing voltage $V_{NE}$. This coil is therefore fully energized whenever the full value of $V_{NE}$ is present. Coil 35 controls relay $K_1$, which is a double-pole double-throw relay, represented in FIG. 2 as switches 37, 39, 41, and 43. When coil 35 is not energized, the relay opens switches 37 and 39, and closes switches 41 and 43. Thus, the main power supply becomes isolated from the subsidiary power supplies, and any residual voltages present in the circuitry of the subsidiary power supplies (due to capacitors, for example) will be shorted to ground through switches 41 and 43. Switches 37, 39, 41, and 43 are shown in the position wherein coil 35 is energized, which is the position wherein a nuclear event is not being detected (switch 19 is open).

When coil 35 is energized, the positions of switches 37, 39, 41, and 43 are as shown in FIG. 2. Switches 37 and 39 are closed, allowing current to flow to the subsidiary power supplies, and switches 41 and 43 are opened.

When switch 19 is closed, voltage $V_{NE}$ is suddenly applied across the primary winding of transformer 21. At the same time, current also flows through light-emitting diode 23. The values of resistors 45 and 47 are chosen to insure that sufficient current flows through diode 23 to cause it to emit light; if the value of resistor 47 is too small, not enough current would flow through diode 23. Diode 29 prevents current from flowing through the loop defined by diode 23 and diode 29; without diode 29, the system would shut itself down during normal operation. The light-emitting diode 23 is optically coupled to a photoelectric transistor 25, the output of which is connected to PWM control circuit 13. When PWM circuit 13 receives a signal from transistor 25, it turns "off", i.e. it effectively opens switch 15 and holds it open. Thus, the main power supply is immediately disabled by the signal from the feedback loop which includes transistor 25.

At the same time, the pulse which appears at the primary winding of transformer 21 is transmitted to the secondary windings, and a pulse appears on the secondary side, with an amplitude proportional to the turns ratio. This pulse is applied across resistor $R_1$ and capacitor $C_1$, and to the gate of field-effect transistor (FET) 27. Thus, the voltage across $R_1$ and $C_1$ is the voltage applied to the gate, called $V_{gate}$. The source and drain of FET 27 are connected across $CA_1$, which is the output filter capacitor of subsidiary power supply 5 (this capacitor is also shown in FIG. 1). The circuit parameters are chosen so that when a pulse is initially transmitted through transformer 21, $V_{gate}$ is sufficiently high, and of the correct polarity, to saturate FET 27, enabling current to flow freely between the source and drain. Thus, FET 27 creates an effective short circuit across $CA_1$ and across the output of subsidiary power supply 5.

The pulse transmitted across transformer 21, due to the closing of switch 19, lasts only for a short time. Therefore, the pulse which drives FET 27 is also short. But the values of $R_1$ and $C_1$ are chosen so that the pulse decays sufficiently slowly to maintain FET 27 in a saturated condition, for a time long enough to insure that $CA_1$ is fully discharged. Diode 33 prevents capacitor $C_1$ from discharging prematurely through the secondary winding of transformer 21. Thus, the circuit which includes diode 33, resistor $R_1$, and capacitor $C_1$ functions as a peak detector, holding the voltage of the pulse for a predetermined time.

Capacitor 31 is used to eliminate noise; the capacitance of $C_1$ is much greater than that of capacitor 31.

Note that the circuit which includes one of the secondary windings of transformer 21, capacitor 31, diode 33, and $C_1$, $R_1$, and FET 27 together comprise the switch $SW_1$, shown in FIG. 1. Similar circuits are provided to form each of the other switches $SW_i$.

Transformer 21 preferably has a core that is designed to saturate within a predetermined amount of time, which is relatively short. The reason is that the circuit which includes the primary winding of transformer 21 is used to short-circuit $V_{NE}$, when switch 19 is closed. If the core is not saturated, then this primary winding will not act as a short circuit.

At the same time that the main power supply is turned off, and the capacitors across the outputs of all power supplies in the system are short-circuited, the system also provides "fail-safe" protection in the following way. After the initial pulse, caused by the actuation of switch 19, has been transmitted through transformer 21, and the core of transformer 21 has saturated, $V_{NE}$ becomes effectively short-circuited, as long as switch 19 remains closed. This is because the resistance of the primary winding is considered to be negligible. Thus, coil 35 is de-energized, and the switches comprising relay $K_1$ assume the position which disconnects the main power supply from the subsidiary power supplies, and short-circuits the control voltage inputs to the subsidiary power supplies to ground. Thus, while a nuclear event is still being detected, the entire system is totally disabled.

The signal from transistor 25, connected to PWM control circuit 13, turns that circuit "off" only momentarily. Circuit 13 remains connected to the main power source. Thus, circuit 13 automatically begins to turn "on" again. The time taken by circuit 13 to return to its normal operating voltage level is a function of RC circuits within circuit 13; these circuits are not explicitly shown in FIG. 2, but are chosen so that circuit 13 returns the main power supply to a predetermined voltage level within a predetermined interval of time. When circuit 13 causes the main power supply to generate power, a voltage $V_{NE}$ begins to appear again. Assume now that switch 19 is still closed, i.e. a nuclear event is still being detected. Light from diode 23 again causes control circuit 13 to be de-energized, thereby deactivating $V_{NE}$ before it has a chance to reach its normal value. Moreover, the parameters of relay coil 35 are chosen such that the coil can move the relay switches only when substantially the full value of $V_{NE}$ is present. Furthermore, because switch 19 is closed, providing a circuit path across $V_{NE}$, it is even more unlikely that coil 35 could become sufficiently energized to activate the relay switches. Thus, as long as switch 19 remains closed, the system remains completely disabled.

Clearly, the process described above is automatically repeated, as long as a signal from the nuclear event sensor is still being detected. When the nuclear event has abated, switch 19 opens. In this case, due to the fact that switch 19 is open, and due to the configuration of diodes 29 and 23, no current can flow through diode 23, and transistor 25 therefore no longer will disable the main power supply. Thus, when the main power supply next attempts to return to full power, it will do so without hindrance. Voltage $V_{NE}$ will rise to its normal value, energizing coil 35, which moves the relay switches to the position shown in FIG. 2.

Note that the present invention, in its preferred embodiment, disables a power supply both at its input end and at its output end. The circuit disables the input end by deactivating the primary winding of transformer 17, and disables the output end(s) by creating a short circuit across the output filter capacitor(s) at the outputs of the various power supplies of the system. Furthermore, for added protection, the invention uses a relay to disconnect all control voltages from the power supplies in the system.

Figure 3:
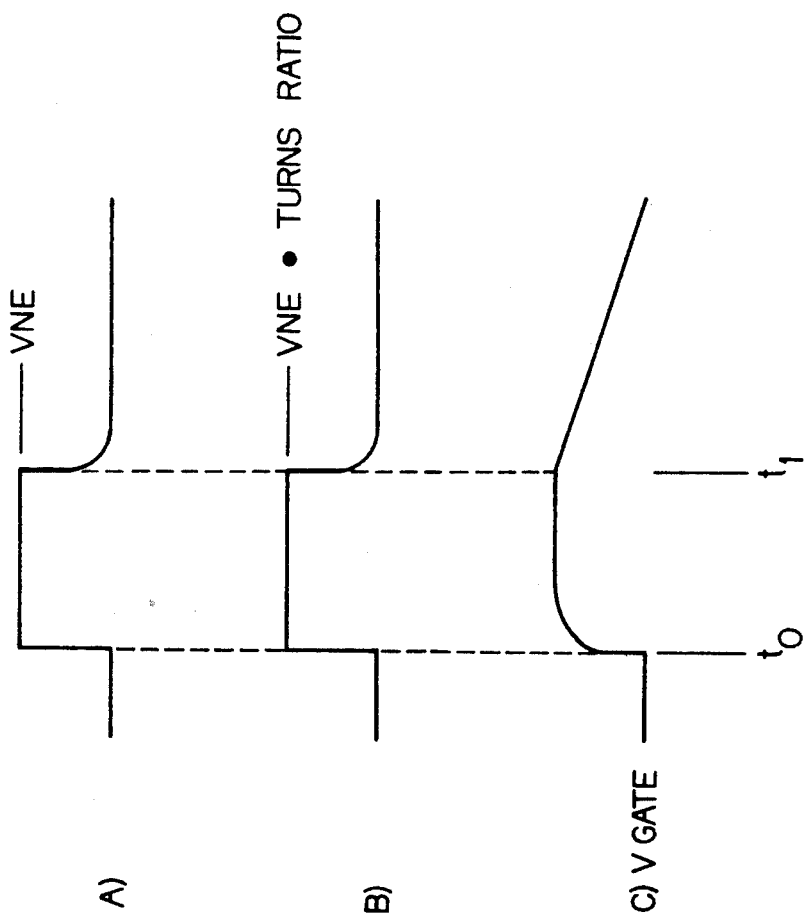
FIG. 3 is a diagram showing pulses that are generated by the circuit of the present invention.

FIG. 3 shows the waveforms of some of the relevant voltages described above. FIG. 3a shows the value of the voltage across the primary winding of transformer 21. When switch 19 is closed, the (reactive) voltage across the primary winding increases rapidly to $V_{NE}$. The voltage remains at this level until time $t_1$, which is when the transformer core becomes saturated. At that point, the reactive voltage across the primary winding decays to zero. Note that $t_1$ is a design parameter; the physical characteristics of the transformer are chosen to achieve the desired value of $t_1$.

FIG. 3b shows the value of the voltage on one of the secondary windings of transformer 21. The latter voltage also rises with the voltage on the primary winding, to a level proportional to the turns ratio, and decays when the core becomes saturated.

FIG. 3c shows $V_{gate}$, the voltage applied to the gate of FET 27. This voltage increases more slowly than the voltages across the transformer windings, and also decays more slowly, thus enabling the FET to be conductive long enough to discharge the output filter capacitor fully. The decay time of the waveform of $V_{gate}$ is a function of the values of $R_1$ and $C_1$.

Thus, in operation, the circuit of the present invention automatically turns "off" the main power supply when it receives a signal from the nuclear event sensor. At the same time, it short-circuits each of the subsidiary power supplies, and their associated output filter capacitors, and also disconnects each power supply in the system from the circuit being powered. Periodically, the system attempts to re-start itself. The time interval at which re-starting is attempted is determined by the time constant of an RC network in the main power supply. The power supply system can return permanently to normal operation only when there is no signal from the nuclear event sensor. Otherwise, the power supply will again be disabled, and the re-start process is repeated until the nuclear event is abated.

The present invention therefore disables electronic circuitry very rapidly, and in an orderly manner, upon detection of a nuclear event. The invention is not limited to use in a nuclear event, however. The invention can be used to disable electronic circuitry upon detection of any condition, the condition being represented by switch 19 of FIG. 2. A nuclear event is only one of many such possible conditions.

Although the invention has been described with respect to certain particular embodiments, it is understood that the invention can be modified in many ways. The circuit topology of the main power supply and subsidiary power supplies can be changed considerably. The main power supply could be controlled by a circuit other than a PWM controller. As mentioned above, instead of a main power supply and various subsidiary supplies, there could be only one power supply in the system. The lightemitting diode and photoelectric transistor can be replaced with other means of providing feedback. The circuitry for creating short circuits across the output end(s) of the power supply can also be varied. The switches $SW_i$ are not limited to field effect transistors; other devices, such as silicon controlled rectifiers, could be used instead. These and other modifications should be apparent to those skilled in the art, and should be deemed within the spirit and scope of the following claims.

What is claimed is:

1. Apparatus for protecting electronic circuitry from damage from a particular condition, the circuitry having at least one power supply, the power supply including a transformer, the apparatus comprising:
   a) means for sensing the presence of the condition, the sensing means being connected to means for closing a switch in response to presence of the condition,
   b) transformer means, connected to the condition sensing means, for generating a pulse in response to a signal from the sensing means, the transformer means being distinct from the transformer of the power supply,
   c) means for connecting said pulse to means for temporarily creating a short-circuit across the output of the power supply, and
   d) means, responsive to the sensing means, for disconnecting the power supply upon detection of the signal from the sensing means, and for permitting the power supply to re-start when said signal is no longer detected, the means for disconnecting being separate from the means for creating a short-circuit.

2. The apparatus of claim 1, wherein the means for temporarily creating a short-circuit includes a transistor connected across the output of the power supply the transistor being connected to receive said pulse, wherein the transistor is biased to conduct when said pulse is present.

3. The apparatus of claim 2, further comprising an RC circuit for controlling the decay time of said pulse, wherein the transistor conducts for a time determined by values of resistance and capacitance in the RC circuit.

4. The apparatus of claim 1, wherein the disconnecting means comprises a feedback loop which senses a current caused by the sensing means, and which disconnects the power supply.

5. The apparatus of claim 4, wherein the feedback loop includes a light-emitting diode which is optically coupled to a photoelectric transistor, the transistor being connected to the power supply.

6. The apparatus of claim 1, wherein the power supply generates a voltage which is used to produce said pulse upon detection of the signal from the sensing means.

7. The apparatus of claim 1, further comprising relay means for disconnecting the power supply upon detection of the signal from the sensing means.

8. In an apparatus for protecting electronic circuitry from damage from a particular condition, the apparatus including a power supply used to supply power to the circuitry, the power supply including a first transformer, and a condition sensor which provides a signal when the condition is detected, the power supply having an input end and an output end, the improvement wherein the power supply generates an "event" voltage, wherein the "event" voltage is electrically connected to a primary winding of a second transformer, the second transformer being distinct from the first transformer, the pulse being connected to means for disconnecting the power supply at its input end, when a current flows through the primary winding.

9. The improvement of claim 8, wherein the disconnecting means includes a light-emitting diode connected to the primary winding, and photoelectric means for detecting light from the diode, the photoelectric means being connected to the input end of the power supply, so as to disconnect the power supply at its input end.

10. The improvement of claim 8, wherein the switch includes a transistor which is biased by the pulse to become conductive.

11. The improvement of claim 10, wherein the switch also includes an RC circuit for regulating the time during which the pulse causes the transistor to conduct.

12. The improvement of claim 8, further comprising relay means for disconnecting the power supply, the relay means being controlled by the "event" voltage, such that the power supply is disconnected when the "event" voltage is not present.

13. A method of protecting electronic circuitry from damage from a particular condition, the circuitry having at least one power supply, the power supply including a first transformer means, the power supply including an input end and an output end, the method comprising the steps of:
  a) waiting for the presence of the condition, and generating a signal when the condition is detected, wherein the signal generating step comprises the step of causing current to flow into a second transformer means, the second transformer means being distinct from the first transformer means, the second transformer means having an output which is connected to an electrically-controlled switch,
  b) closing the electrically-controlled switch, by said signal, the switch being connected across the output end of the power supply, wherein said output end is short-circuited by the switch,
  c) deactivating the power supply, at its input end,
  d) re-starting the power supply, and
  e) repeating steps (a), (c), and (d) until said signal is no longer detected.

14. The method of claim 13, wherein steps (b) and (c) are begun substantially simultaneously.

15. The method of claim 13, wherein the switch of step (b) is held closed for a time sufficient to discharge a filter capacitor connected across the output end of the power supply.

16. The method of claim 13, wherein the electrically-controlled switch comprises a transistor connected across the output end of the power supply.

17. The method of claim 16, wherein the transistor is connected to an RC circuit which governs the time during which the transistor is conductive.

18. The method of claim 13, wherein the first transformer means comprises a transformer having a primary and a secondary winding, wherein the current in the secondary winding of the power supply transformer also flows through a light-emitting diode, the diode being optically coupled to a photoelectric means, the photoelectric means being connected to the input end of the power supply and being capable of deactivating the power supply.

19. The method of claim 13, wherein the condition is a nuclear event.

20. The method of claim 13, wherein step (c) also includes the step of operating a separate relay means to disconnect the power supply upon detection of the condition.

* * * * *